(12) United States Patent
Nilsson et al.

(10) Patent No.: US 6,635,210 B2
(45) Date of Patent: Oct. 21, 2003

(54) METHOD FOR MANUFACTURING A SHELL ELEMENT FOR AN ELECTRONIC DEVICE

(75) Inventors: Gert Nilsson, Sjöbo (SE); Michael Persson, Landskrona (SE)

(73) Assignee: Telefonaktiebolaget LM Ericsson(Publ), Stockholm (SE)

( * ) Notice: Subject to any disclaimer, the term of this patent is extended or adjusted under 35 U.S.C. 154(b) by 104 days.

(21) Appl. No.: 09/789,173

(22) Filed: Feb. 20, 2001

(65) Prior Publication Data

US 2001/0024702 A1 Sep. 27, 2001

(30) Foreign Application Priority Data

Feb. 23, 2000 (EP) ............................................ 00610024

(51) Int. Cl.$^7$ .............................................. B29C 45/14
(52) U.S. Cl. ...................... 264/155; 264/161; 264/250; 264/259
(58) Field of Search ................................ 264/145, 153, 264/154, 155, 163, 161, 250, 251, 254, 255, 259, 275, 294, 266; 428/13, 14; 425/121, 129.1

(56) References Cited

U.S. PATENT DOCUMENTS

| | | | | |
|---|---|---|---|---|
| 5,679,304 A | * | 10/1997 | Watanabe et al. | ............ 264/242 |
| 5,707,581 A | * | 1/1998 | Yamazaki | .................. 264/511 |
| 5,989,480 A | * | 11/1999 | Yamazaki | .................. 264/511 |
| 6,264,869 B1 | * | 7/2001 | Notarpietro et al. | ........ 264/247 |

FOREIGN PATENT DOCUMENTS

| | | |
|---|---|---|
| EP | 0 932 288 A1 | 7/1999 |
| JP | 60219021 | 11/1985 |
| JP | 07007284 | 1/1995 |
| JP | 11348072 | 12/1999 |
| WO | WO 81/00654 | 3/1981 |

OTHER PUBLICATIONS

Annex to the European Search Report on European Patent Application No. EP 00 61 0024, Jul. 5, 2000, p. 1.

* cited by examiner

*Primary Examiner*—Angela Ortiz
(74) *Attorney, Agent, or Firm*—Jenkens & Gilchrist, P.C.

(57) ABSTRACT

A method of manufacturing a shell element (13) for an electronic device, said shell element (13) having a front part(5) and at least one part that is angled in relation to said front part (5). The shell element (13) further comprises a formed sheet (6) that constitutes at least a part of the outer surface of said front part (5) and at least a part of said at least one part that is angled in relation to the front of the shell element (13). The method comprises the steps of first forming a sheet (1) to a desired shape including a part that is angled in relation to a front part (5) and then injection molding a plastics material on the back of the formed sheet (6). At least one opening (7) is provided in the angled part of the formed sheet (6) before the plastics material is injection molded on the back of the formed sheet (6) and the at least one opening (7) is left open during the injection molding of the plastics material on the back of the formed sheet (6). A shell element manufactured by this method is also disclosed.

11 Claims, 2 Drawing Sheets

METHOD FOR MANUFACTURING A SHELL ELEMENT FOR AN ELECTRONIC DEVICE

Figure 1:
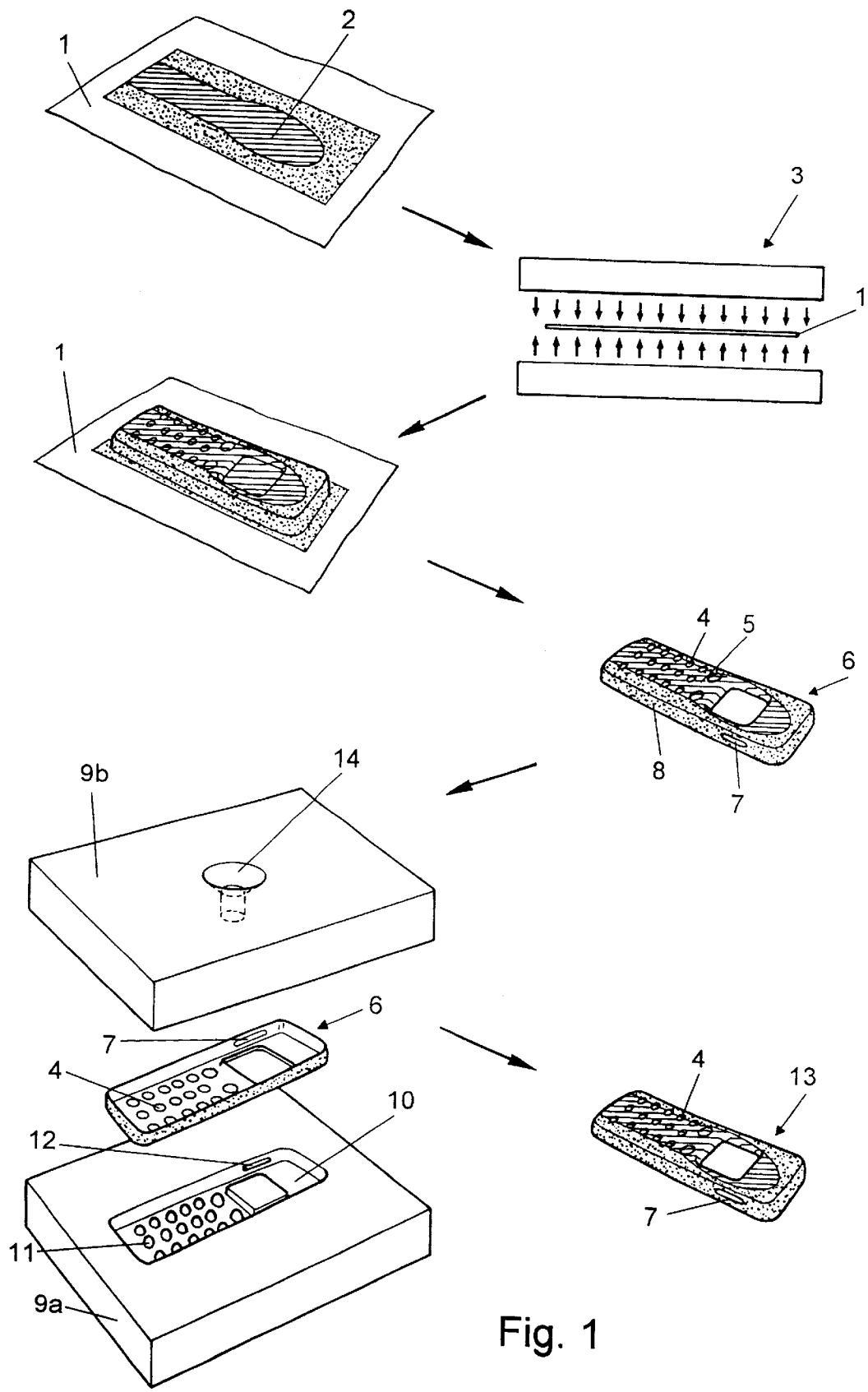

A method for manufacturing a shell element for an Electronic Device.

The invention relates to a method of manufacturing a shell element for an electronic device, said shell element having a front and at least one part that is angled in relation to said front, said shell element further comprising a formed sheet that constitutes at least a part of the outer surface of said front and at least a part of said part that is angled in relation to the front of the shell element, said method comprising the steps of:

forming a sheet to a desired shape including a part that is angled in relation to a front part, injection moulding a plastics material on the back of the formed sheet.

The invention further relates to a shell element manufactured by this method.

The term electronic device includes portable radio communication equipment which includes all equipment such as mobile telephones, pagers, communicators, i.e. electronic organizers, smartphones or the like. Another example of an electronic device is a Personal Digital Assistant (PDA).

In order to produce electronic equipment such as mobile phones with varying outer appearances, a number of different techniques have been developed. One of these techniques is the one described above in which a sheet of e.g. PC (polycarbonate) is provided with a decoration in terms of a print. The sheet is then formed into a desired shape by first heating the sheet, e.g. in an infra-red oven, and then use any conventionally known technique to form the heated sheet, e.g. by high pressure forming, hydro forming or vacuum forming. The heated sheet may also be positioned in a press mould with mould parts that form the sheet into the desired shape.

When the sheet is cooled, it is removed from the press mould or male form part. In relation to the present invention, the formed sheet is provided with at least one part—preferably a circumferential flange—that is angled in relation to the front of the formed sheet.

Usually, the edges of the formed sheet are trimmed and openings for e.g. keys and a display are provided in the front of the formed sheet. The openings may be made by punching or cutting.

The formed sheet is then positioned in an injection mould in which one mould part has an inner shape that is complementary to the outer shape of the formed sheet and of the finished shell element. The mould part is provided with protrusions that extend into the openings of the formed sheet. The protrusions of the mould part abut the other mould part when the injection mould is closed.

A plastics material, such as PC or ABS, is injected into the closed injection mould onto the back of the formed sheet. Due to the above-mentioned protrusions the finished shell element is provided with openings corresponding to the openings in the formed sheet.

When the plastics material is cooled, the finished shell element is removed from the injection mould. The shell element needs no further trimming.

By using the above-described method, varying outer appearances of e.g. mobile phones may be accomplished by varying only the printed decoration on the sheet, i.e. the method of manufacturing remains unchanged. This technique has therefore been found to be economically beneficial if it is desired to vary the outer appearances of a shell element for electronic devices.

JP patent abstract No. 59-152,834 discloses a method of manufacturing a plastics injection moulded item with openings and an injection mould therefore. The injection mould is provided with stamping pins that punch the openings in a preformed and decorated sheet when the injection mould is closed. The plastics material is then injection moulded directly on the back of the preformed sheet to form a finished shell element.

According to the prior art, shell elements of the type described above are manufactured with openings in the front part only. If a component is to be mounted in a part of the shell element that is angled in relation to the front part, this area is provided with a notch extending from the edge, and the component is mounted in the notch. However, this way of mounting a component does not fasten the component satisfactorily to the shell element since, at the one side, the component is not supported by the shell element.

A bore may be provided in the angled area for mounting a component securely. This, however, requires an additional working procedure which further results in more waste from the removed material.

It is an object of the invention to provide a method of manufacturing a shell element of the above-mentioned type in which it is possible to mount a component directly in an opening in an angled area in relation to the front part of the shell element, which method overcomes the above-mentioned problems.

This object is achieved by providing at least one opening in the angled part of the formed sheet mentioned in the opening paragraph, said opening being provided before the plastics material is injection moulded on the back of the formed sheet and leaving the at least one opening open during the injection moulding of a plastics material on the back of the formed sheet.

Thereby the finished shell element is manufactured with an opening in an angled part without need for any further trimming.

The opening in the angled part of the formed sheet is preferably punched or cut out. The punching or cutting of the opening in the angled part may be performed in the same tool and in the same working procedure in which the openings in the front of the formed sheet is punched or cut, or it may be provided in a separate tool.

The edges of the formed sheet are preferably trimmed and openings in the front part of the formed sheet, if any, are preferably provided before the plastics material is injection moulded on the back of the formed sheet. Thereby no further trimming of the finished shell element after injection moulding is necessary.

The injection mould may be provided with at least one raised portion that extends into at least one opening of the formed sheet when the formed sheet is positioned in the injection mould, or it may be provided with at least one displaceable core member that is displaced into at least one opening of the formed sheet when the formed sheet is positioned in the injection mould.

If the injection mould is provided with raised portions, the injection mould can be made relatively simple. This structure requires, however, that the formed sheet as well as the finished shell element is sufficiently flexible in order to flex into and out of the injection mould part that has these raised portions. A more complex structure of the injection mould is achieved if it is provided with displaceable cores. However, if the material used is relatively unflexible, this may be a preferred injection mould structure since the formed sheet can be positioned directly in the injection mould without flexing, and the finished shell element can be removed from the injection mould without flexing.

The formed sheet may preferably cover the entire front of the shell element while the angled part comprises a circumferential flange that extends from the front of the shell element. Thereby the outlook of the shell element is determined solely by the appearance of the formed sheet. The plastics material that is injection moulded onto the back of the formed sheet can therefore be of any kind that fulfils the physical requirements to the material regardless of colour and appearance.

In a preferred embodiment the sheet is a plastics material, such as polycarbonate (PC), and the material that is injection moulded on the back of the formed sheet is also a plastics material, such as PC or ABS. Such plastics materials can be easily formed to the desired shape and are very suitable for injection moulding and calls for good chemical bonding between the formed sheet and the backing.

The electronic device, which the shell element is intended for, is preferably a mobile radio station, such as a mobile telephone.

It shall be emphasised that the term "comprise/comprising" when used in this specification is taken to specify the presence of stated features, integers, steps or components but does not preclude the presence or addition of one or more other features, integers, steps components or groups thereof.

Figure 2A:
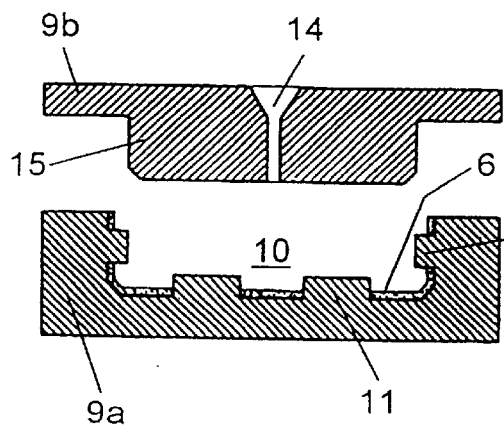
Figure 2B:
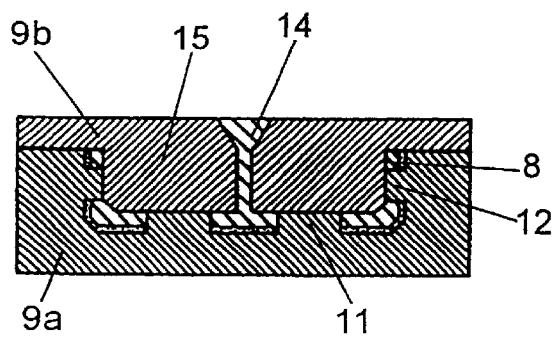
Figure 3:
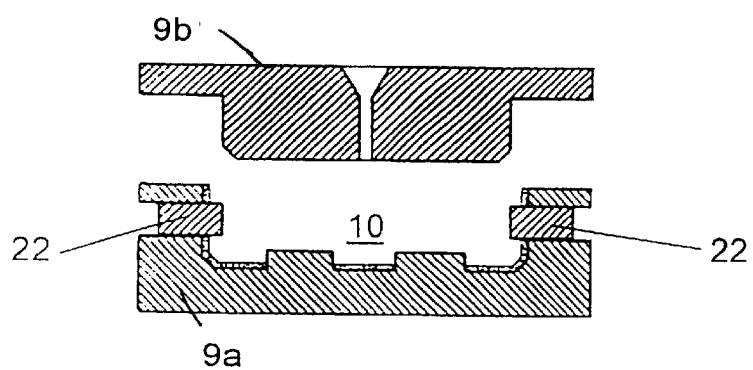

The invention will be described in detail in the following with reference to the drawings in which FIG. 1 stepwise shows the manufacturing of a shell element according to the invention, FIGS. 2a and 2b each shows a cross-section of an injection mould in a first embodiment for use in the method of manufacturing according to the invention, and FIG. 3 shows a cross-section of an injection mould in a second embodiment for use in the method of manufacturing according to the invention.

FIG. 1 shows the manufacturing process for a shell element having openings in side parts that are angled in relation to the front of the shell element.

The starting material is a sheet 1 of a plastics material, such as polycarbonate (PC). The sheet 1 is provided with a print 2 which may comprise more than one colour or pattern as shown. The print may be provided at one or either side of the sheet 1 or it may be provided between two layers of a laminated sheet 1.

The sheet 1 is heated, e.g. in an infra-red oven 3 as schematically illustrated, and is then formed into a desired shape by any known process, such as high pressure forming, vacuum forming, hydro forming or in a press tool. These forming processes are well-known in the art and are not shown in details. The preferred process is the high pressure forming process in which the sheet is positioned over a male form and pressurized air is applied to the outer side of the heated sheet.

The edge of the sheet 1 is trimmed by cutting, and openings 4 are punched or cut in the front 5 of the formed sheet 6. Openings 7 are also punched or cut in the flange 8 extending from the front 5 of the formed sheet 6. The flange 8 is angled in relation to the front 5 of the formed sheet 6. The angulation may in a preferred embodiment be about 90° as shown, i.e. the flange 8 extends in a substantially right angle in relation to the front 5 of the formed sheet 6.

At this point in the manufacturing process the formed and trimmed sheet 6 has achieved the desired shape and no further trimming is needed.

The formed sheet 6 is positioned in a lower mould part 9a of an injection mould. This lower mould part 9a is provided with a recess 10 having a shape that is complementary to the shape of the formed sheet 6, i.e. the formed sheet 6 fits snugly into the recess 10. The recess 10 is provided with raised portions 11, 12 that fit into the openings 4, 7 provided in the formed sheet 6. The raised portions 11, 12 are abutted by the upper mould part 9b when the mould is closed, thereby forming cores for moulding openings in the finished shell element 13.

The upper mould part 9b is provided with a sprue cup 14 through which the plastics material, such as PC or ABS, is injected. The injected plastics material spreads throughout the injection mould, forming a backing for the formed sheet 6 by adhering to the back of it and creating openings defined by the raised portions 11, 12 of the injection mould.

When cooled, the finished shell element 13 is ejected from the injection mould and is ready to be furnished with components extending through the openings 4, 7, i.e. no further trimming is necessary.

FIGS. 2a and 2b show schematically a cross-section through an opened and a closed injection mould corresponding to the injection mould disclosed in FIG. 1.

The injection mould comprises a lower injection mould part 9a and an upper injection mould part 9b. The lower injection mould part 9a is provided with raised portions 11, 12 that protrude from the inner sidewall into the recess 10. A formed sheet 6 is positioned in the recess 10, ready for injection moulding of a plastics material on the back of it. The formed sheet 6 is relatively thin and flexible and it can usually be pressed readily into the shown position having the raised portions 11, 12 extending through the openings 4, 7 of the formed sheet 6.

Since the raised portions 11 and 12 extend in different directions, the formed sheet 6 is securely retained in the recess when it is positioned as shown. Thus, provision of openings in the angled part or flange 8 of the formed sheet 6 calls for good retaining of the formed sheet 6 in the injection mould recess 10.

After the formed sheet 6 is positioned in the recess 10, the injection mould is closed as shown in FIG. 2b. The upper injection mould part 9b is provided with a male part 15 that fits into the recess 10, abutting on the raised portions 11, 12. When a plastics material is injected through the sprue cup 14, it spreads throughout the injection mould, adhering to the back of the formed sheet 6 and creating openings defined by the raised portions 11, 12 abutting the male part 15.

When the plastics material is cooled, the injection mould is opened and the finished shell element 13 is ejected. In order to eject the finished shell element 13, the flange 8 is pressed inwards to release the opening 7 from the raised portion 12.

FIG. 3 shows a cross-section of an injection mould in a second embodiment for use in the method of manufacturing according to the invention.

This injection mould corresponds to the injection mould shown in FIGS. 2a and 2b except that the raised portions 12 have been replaced by displaceable core members 22. This means that, when the core members 22 are retracted, the finished shell element 13 can be ejected from the injection mould without deforming the flange 8, which is otherwise the case when the raised portions 12 are fixed as shown in FIGS. 2a and 2b. An injection mould having displaceable core members 22 may also advantageously be applied if the formed sheet 6 is made of a relatively unflexible material that cannot be deformed so as to snap over any fixed protrusions like the raised portions 12 shown in FIGS. 2a and 2b.

A preferred embodiment for a shell element according to the invention has been described above with reference to the drawings. It should be realized, however, that the shell element may have other forms than the one shown. For instance, the formed sheet could constitute only a part of the surface of the front of the shell element, whereas the injection moulded plastics material constitutes a backing for the formed sheet as well as a part of the outer surface of the front of the shell element. According to the invention, however, at least a part of the formed sheet is angled in relation to the front of the shell element, said angled part being provided with at least one opening.

What is claimed is:

1. A method of manufacturing a shell element for an electronic device, said shell element having a front part and at least one flange that extends from the front part and that is angled in relation to said front part, said shell element further comprising a formed sheet that constitutes at least a part of the outer surface of said front part and at least a part of said at least one flange, said method comprising:

forming a sheet that includes a front part and a flange that extends from and is angled in elation to the front part; and injection moulding a plastics material on the back of the formed sheet, said injection moulding including:

providing at least one opening in the flange of the formed sheet before the plastics material is injection moulded on the back of the formed sheet; and leaving the at least one opening in the flange open during the injection moulding of the plastics material on the back of the formed sheet.

2. The method according to claim 1, wherein the at least one opening in the flange of the formed sheet is punched out.

3. The method according to claim 1, wherein the at least one opening in the flange of the formed sheet is cut out.

4. The method according to claim 1, further comprising trimming edges of the formed sheet before the plastics material is injection moulded on the back of the formed sheet.

5. The method according to claim 1, further comprising providing at least one opening in the front part of the formed sheet before the plastics material is injection moulded on the back of the formed sheet.

6. The method according to claim 1, wherein an injection mould is provided with at least one raised portion that extends into the at least one opening of the flange when the formed sheet is positioned in the injection mould for injection moulding the plastics material on the back of the formed sheet.

7. The method according to claim 1, wherein an injection mould is provided with at least ore displaceable core member that is displaced into the at least one opening of the flange when the formed sheet is positioned in the injection mould for injection moulding the plastics material on the back of the formed sheet.

8. The method according to claim 1, wherein the formed sheet covers the entire front part of the shell element and the flange comprises a circumferential flange that extends from the front part of the shell element.

9. The method according to claim 1, wherein the sheet comprises polycarbonate (PC).

10. The method according to claim 1, wherein material that is injection moulded on the back of the formed sheet comprises PC or ABS.

11. The method according to claim 1, wherein said electronic device, comprises a mobile telephone.

* * * * *

UNITED STATES PATENT AND TRADEMARK OFFICE
CERTIFICATE OF CORRECTION

PATENT NO.      : 6,635,210 B2
DATED           : October 21, 2003
INVENTOR(S)    : Gert Nilsson It is certified that error appears in the above-identified patent and that said Letters Patent is hereby corrected as shown below:

<u>Column 6,</u>
Line 16, please remove the term "ore" and replace with the term -- one --.

Signed and Sealed this

Sixteenth Day of December, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,635,210 B2
DATED : October 21, 2003
INVENTOR(S) : Gert Nilsson

It is certified that error appears in the above-identified patent and that said Letters Patent is hereby corrected as shown below:

Column 5,
Line 22, please remove the term "elation" and replace with the term -- relation--.

Signed and Sealed this

Eighth Day of June, 2004

JON W. DUDAS
*Acting Director of the United States Patent and Trademark Office*